(12) United States Patent
Bartholomew et al.

(10) Patent No.: US 9,473,710 B2
(45) Date of Patent: Oct. 18, 2016

(54) VIDEO SIGNAL TERMINATION DETECTION CIRCUIT

(71) Applicant: Rosemount Aerospace Inc., Burnsville, MN (US)

(72) Inventors: John C. Bartholomew, Minneapolis, MN (US); Nathan D. Evans, Prior Lake, MN (US); James W. Swenson, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 71 days.

(21) Appl. No.: 14/172,001

(22) Filed: Feb. 4, 2014

(65) Prior Publication Data

US 2015/0222822 A1   Aug. 6, 2015

Related U.S. Application Data

(60) Provisional application No. 61/934,197, filed on Jan. 31, 2014.

(51) Int. Cl.
| | |
|---|---|
| *G06F 3/00* | (2006.01) |
| *H04N 5/268* | (2006.01) |
| *H04N 5/217* | (2011.01) |
| *G06F 13/40* | (2006.01) |
| *H04N 9/64* | (2006.01) |
| *H04N 5/77* | (2006.01) |

(52) U.S. Cl.
CPC .......... *H04N 5/268* (2013.01); *G06F 13/4086* (2013.01); *H04N 5/217* (2013.01); *H04N 9/642* (2013.01); *H04N 5/77* (2013.01)

(58) Field of Classification Search
CPC ...... H04N 5/268; H04N 9/642; H04N 5/217; G06F 13/4086
See application file for complete search history.

(56) References Cited

U.S. PATENT DOCUMENTS

| | | | |
|---|---|---|---|
| 5,953,057 A | 9/1999 | Thompson et al. | |
| 6,384,637 B1 * | 5/2002 | Nguyen et al. | 327/54 |
| 6,384,867 B1 * | 5/2002 | Seino | G09G 5/005 |
| | | | 348/555 |
| 6,404,713 B1 * | 6/2002 | Ueki | G11B 7/1267 |
| | | | 369/47.5 |
| 6,411,330 B1 | 6/2002 | Purcell et al. | |

(Continued)

FOREIGN PATENT DOCUMENTS

| | | | | |
|---|---|---|---|---|
| CN | 201910228 U | * | 7/2011 | |
| CN | 201910228 U | * | 7/2011 | G09G 5/00 |
| CN | 202602805 U | | 12/2012 | |

OTHER PUBLICATIONS

Extended European Search Report dated Jun. 9, 2015, issued during the prosecution of corresponding European Patent Application No. 15153508.5.

*Primary Examiner* — Jing-Yih Shyu
(74) *Attorney, Agent, or Firm* — Locke Lord LLP; Scott D. Wofsy; Daniel J. Fiorello

(57) ABSTRACT

A video signal termination detection system includes an input configured to connect to a video driver that produces a video signal, an output configured to connect to a video receiver that operates with a signal type, a detection circuit connected between the input and the output and configured to detect the signal type of the video receiver and to output a detection signal, and a conversion circuit configured to receive the video signal from the video driver and to convert the video signal to the signal type if the video signal is different than the signal type.

12 Claims, 3 Drawing Sheets

(56) References Cited

U.S. PATENT DOCUMENTS

| | | | |
|---|---|---|---|
| 6,466,269 B1 * | 10/2002 | Someya | G06T 3/4007 348/448 |
| 7,617,513 B2 * | 11/2009 | McCafferty | H04N 7/106 725/153 |
| 7,898,601 B1 | 3/2011 | Sivertsen | |
| 8,081,212 B2 | 12/2011 | Yoshioka et al. | |
| 8,127,333 B2 | 2/2012 | Weidel | |
| 8,330,874 B2 * | 12/2012 | Yamamoto | H04N 7/01 348/441 |
| 2008/0117127 A1 * | 5/2008 | Kwak | G09G 5/006 345/60 |
| 2008/0117994 A1 * | 5/2008 | Shetty | H04W 52/52 375/257 |
| 2009/0172207 A1 | 7/2009 | Remaker et al. | |
| 2011/0234797 A1 | 9/2011 | Wende et al. | |
| 2012/0319781 A1 * | 12/2012 | Scott | G11C 7/1084 330/310 |

\* cited by examiner

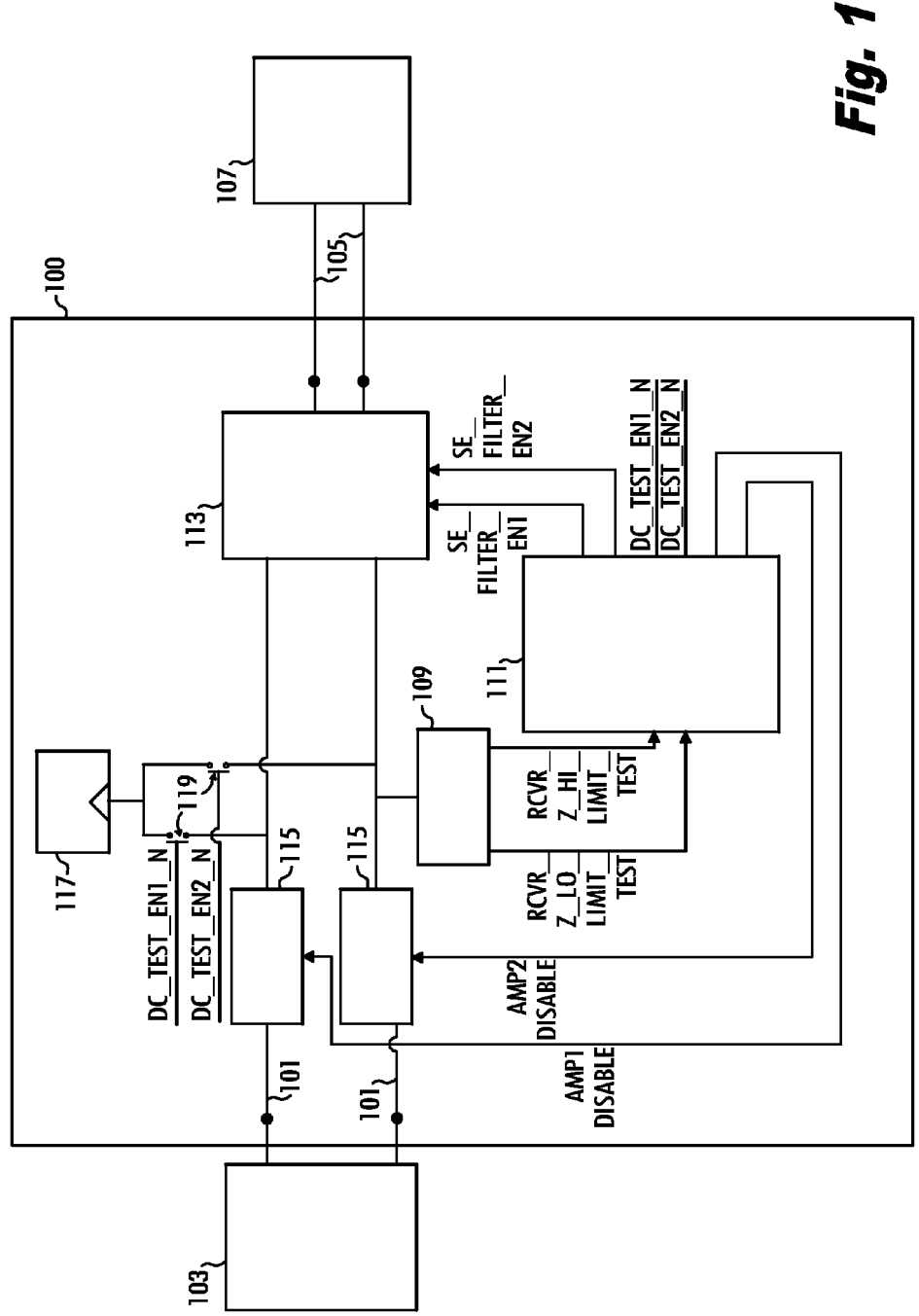

VIDEO SIGNAL TERMINATION DETECTION CIRCUIT

CROSS-REFERENCE TO RELATED APPLICATIONS

This application claims the benefit of and priority to U.S. Provisional Patent Application No. 61/934,197 filed Jan. 31, 2014, which is incorporated by reference herein in its entirety.

BACKGROUND

1. Field

The present disclosure relates to video receiver and video driver termination technology, more specifically to video signal input/output.

2. Description of Related Art

Certain video transmitters and receivers require the transmission paths and ground references to be properly terminated to function properly. For example, a single-ended video receiver may require a single-ended video signal provided by a camera or other video driver to be able to function and display video. However, some receivers require different signal types (e.g. differential) and may not function when a video driver that only outputs a single-ended signal is connected thereto.

Such conventional methods and systems have generally been considered satisfactory for their intended purpose. However, there is still a need in the art for systems and methods that improve video signal transmission and universality between video drivers and receivers. The present disclosure provides a solution for this problem.

SUMMARY

In at least one aspect of the present disclosure, a video signal termination detection system includes an input configured to connect to a video driver that produces a video signal having a driver video signal type, an output configured to connect to a video receiver that operates with a receiver video signal type, a detection circuit connected between the input and the output and configured to detect the video receiver signal type of the video receiver and to output a detection signal, and a conversion circuit configured to receive the video signal from the video driver and to convert the video driver signal type to that of the receiver if the driver video signal type is different from the signal type of the video receiver.

The system can also include a video interrupt switch configured to interrupt the video signal. In at least some embodiments, the video interrupt switch can be included as part of and/or operative with the detection circuit. In some embodiments, the system further includes a test voltage supply for supplying a test voltage to the system when the video signal is interrupted by the video interrupt switch, the supplying of a test voltage being controlled by at least one test voltage switch.

It is envisioned that the system can include a controller configured to control at least one of the video interrupt switch, the test voltage switch, and the conversion circuit based on a detection signal received from the detection circuit. The controller can include a processor, discrete logic, and/or programmable logic. Further, at least one of the video interrupt switch and the test voltage switch can include a metal-oxide-semiconductor filed-effect transistor (MOSFET) operatively connected to switch on or off based on a signal from the controller.

In some embodiments, the system can be implemented into the video driver (e.g. the camera assembly) or the video receiver. The signal type can be one of single-ended video signal or a differential-ended video signal.

In accordance with at least one aspect of this disclosure, a method of detecting a signal type to be received by a video receiver includes receiving a video signal, disabling the video signal from reaching the video receiver, supplying a test voltage to the video receiver while the video signal is disabled, determining the signal type to be received by the video receiver, and enabling the video signal to reach the video receiver after conforming the video signal to the signal type if the video signal is different from the signal type of the video receiver. The disabling step can be done by disabling a video signal amplifier and/or video buffer.

In another embodiment, a method includes automatically determining a receiver video signal type used by a video receiver and outputting a video signal to the video receiver in conformance with the receiver video signal type of the video receiver. The receiver video signal type can be one of single-ended or differential-ended, and the method can further include filtering the video signal for a single video transmission path. The method can also further include filtering a single-ended video signal to be usable by a differential-ended termination, and vice-versa.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a systematic view of an embodiment of a system in accordance with the present disclosure.

DETAILED DESCRIPTION

Figure 2A:
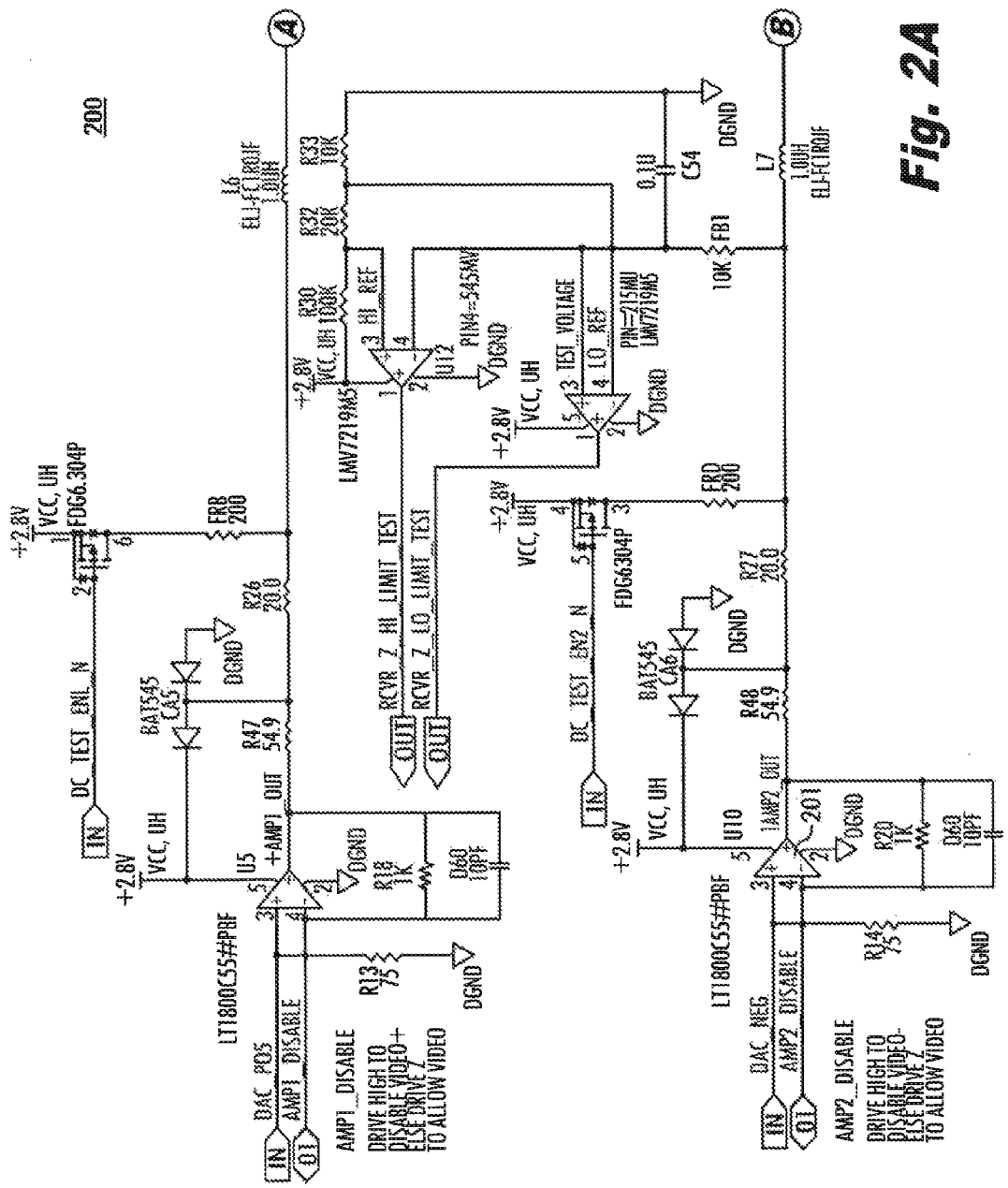
FIGS. 2A and 2B are a circuit diagram of an embodiment of a system in accordance with the present disclosure.

Reference will now be made to the drawings wherein like reference numerals identify similar structural features or aspects of the subject disclosure. For purposes of explanation and illustration, and not limitation, an embodiment of system in accordance with the disclosure is shown in FIG. 1 and is designated generally by reference character 100. The systems and methods described herein can be used for universal and/or automatic video signal detection and/or conversion for video drivers and video receivers having differing electrical or software requirements.

Referring to FIG. 1, in at least one aspect of the present disclosure, a video signal termination detection system 100 includes input lines 101 configured to connect to a video driver 103 that produces a video signal. The system 100 can be configured as an adapter that connects separately to the video driver 103. In other embodiments, the system 100 can be integrated with the video driver 103 as part of a camera or other video signal producing device, and/or integrate with a video receiver/display.

Output lines 105 can be configured to connect to a video receiver 107 that operates with a particular signal type. For example, the video receiver 107 can be configured to receive a single-ended signal, a differential signal, or any other suitable signal type. For example, a single-ended signal can be configured to operate with a termination resistance of approximately 75 Ohms (e.g., 75 Ohms to a shared ground reference between the video driver and receiver) on one of the output lines 105, and the other output line 105 may be connected to ground. Conversely, a differential signal can be configured to operate with a termination resistance on each output line 105 to ground or a higher termination resistance between the differential video signal pairs (e.g. about 100 Ohms to 1 Mega-Ohms).

A detection circuit 109 can be connected between the input 101 and the output 105 and can be configured to detect the signal type that the video receiver 107 is capable of using (e.g. single-ended or differential). The detection circuit 109 can output a detection signal to a controller 111 (described in further detail below).

A conversion circuit 113 can be configured to receive and/or filter the video signal from the video driver 103 and to convert the video signal to the required signal type if the video signal is different than the required signal type. For example, if the video signal that is output by the video driver 103 is configured for driving a single-ended termination, but the video receiver 107 requires a differential termination, the conversion circuit 113 can change the effective circuit to allow the video signal to conform to the requirements of the video receiver 107. In some embodiments, this can be accomplished by converting the effective circuit of the system 100 between a differential circuit and a single-ended circuit using one or more switches and/or by filtering as needed.

The system 100 can also include at least one video interrupt switch 115 configured to interrupt the video signal. As shown, the interrupt switches 115 can include and/or be included as part of a video buffer circuit, an amplifier circuit, the detection circuit and/or any other suitable component. For example, referring to the system 200 shown in FIGS. 2A and 2B, op-amp 201 is configured to act as a switch by comparing DAC_NEG signal with the AMP2_DISABLE signal to output or disable a video signal when the proper disable signal is sent to the op-amp 201. AMP2_DISABLE can also be configured to disable the differential video reference signal when a single-ended signal is required by the receiver. In other embodiments, the interrupt switch 115 can include any suitable electrical, digital, electromechanical, and/or mechanical switch (e.g. FET, MOSFET).

Referring to FIG. 1, the system 100 can further include a test voltage supply 117 for supplying a test voltage to the system 100 (e.g., to the video receiver 107 to detect the termination of the video receiver 107) when the video signal is interrupted by the video interrupt switch 115. The supplying of a test voltage can be controlled by at least one test voltage switch 119. The test voltage switch 119 can be any suitable electrical, digital electromechanical, and/or mechanical switch (e.g. FET, MOSFET). The test voltage can be any suitable voltage configured to drive the detection circuit 109 such that the detection circuit 109 can determine the required signal type for the video receiver 107.

The controller 111 as described herein can be configured to control at least one of the video interrupt switch 115, the test voltage switch 119, and the conversion circuit 113 based on a detection signal received from the detection circuit 109. In some embodiments, the detection circuit 109 forms a portion of the controller 111. The controller 111 can include one or more processors, programmable logic, discrete logic, and/or any other suitable circuitry or device for processing signals and outputting at least one control signal. As would be appreciated, the controller 111 can include any necessary components to function (e.g. memory, data storage, software, firmware, etc).

The controller 111 can be configured to automatically temporarily shut off the input video signal, switch on the test voltage, determine the receiver type, convert the effective circuit to the proper effective circuit to function with the video receiver, disconnect the test voltage, and reconnect the input video signal to supply the proper video signal to the receiver.

Figure 2B:
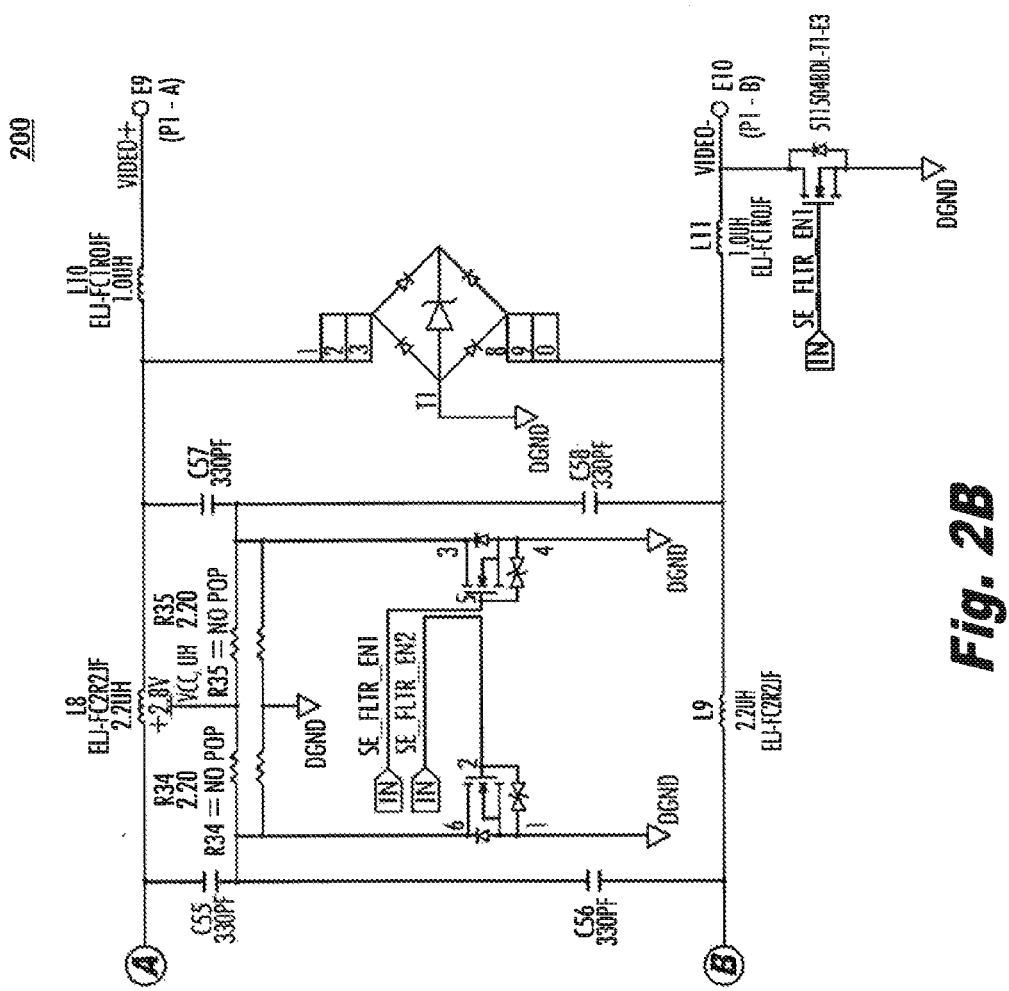

Reference can be made to FIGS. 2A and 2B for a detailed embodiment of a circuit configured to act as a universal video driver—video receiver signal adapter for allowing cooperation between a single-ended signal and a differential signal mismatch. A controller similar to that described above is not shown in FIGS. 2A and 2B, but can be included and connected to any suitable portion of system 200 (e.g. IN at SE_FLTR_EN1 in FIG. 2B) to control any suitable component of system 200.

In accordance with at least one aspect of this disclosure, a method of detecting a signal type to be received by a video receiver (e.g., video receiver 107) can include receiving a video signal, disabling the video signal from reaching the video receiver (e.g., video receiver 107), supplying a test voltage while the video signal is disabled, determining the signal type to be received by the video receiver (e.g., video receiver 107), and enabling the video signal to reach the video receiver (e.g., video receiver 107) after conforming the video signal to the signal type if the video signal is different than the signal type of the video receiver (e.g., video receiver 107). The disabling step can be done by disconnecting a video signal amplifier or other suitable component.

In another embodiment, the method can include automatically determining a signal type used by a video receiver (e.g., video receiver 107), and outputting a video signal to the video receiver (e.g., video receiver 107) in conformance with the signal type.

The methods and systems of the present disclosure, as described above and shown in the drawings, provide for universal and/or automatic video signal detection and/or conversion systems/methods for video drivers (e.g., video driver 103) and video receivers (e.g., video receiver 107) having differing electrical and/or software requirements. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A video signal termination detection system, comprising:
    an input configured to connect to a video driver that produces a video signal having a driver video signal type;
    an output configured to connect to a video receiver that operates with a receiver video signal type;
    a detection circuit connected between the input and the output and configured to detect the receiver video signal type of the video receiver and to output a detection signal;
    a conversion circuit configured to receive the video signal from the video driver and to convert the driver video signal type to the receiver video signal type of the video receiver if the driver video signal type is different from the receiver video signal type of the video receiver;

a video interrupt switch configured to interrupt the video signal;

a test voltage supply for supplying a test voltage to the system when the video signal is interrupted by the video interrupt switch, the supplying of the test voltage being controlled by at least one test voltage switch; and a controller configured to control at least one of the video interrupt switch, the test voltage switch, and the conversion circuit based on the detection signal received from the detection circuit;

wherein the controller is configured to shut off the input, switch on the test voltage, determine the receiver video signal type, disconnect the test voltage, and reconnect the input to supply the receiver video signal type to the video receiver.

2. The video signal termination detection system of claim 1, wherein the controller includes at least one of a processor, a discrete logic, or programmable logic.

3. The video signal termination detection system of claim 1, wherein at least one of the video interrupt switch and the test voltage switch include a metal-oxide-semiconductor field-effect transistor (MOSFET) operatively connected to switch on or off based on a signal from the controller.

4. The video signal termination detection system of claim 1, further comprising the video driver.

5. The video signal termination detection system of claim 1, further comprising the video receiver.

6. The video signal termination detection system of claim 1, wherein the video signal is one of single-ended video signal and a differential-ended video signal.

7. A method of detecting and/or conforming to a signal type to be received by a video receiver, comprising:

receiving a video signal;

disabling the video signal from reaching the video receiver using a video interrupt switch configured to interrupt the video signal;

supplying a test voltage from a test voltage supply to the video receiver while the video signal is disabled, the supplying of the test voltage being controlled by at least one test voltage switch;

determining the signal type to be received by the video receiver based on a detection signal from a detection circuit; and enabling the video signal to reach the video receiver after conforming the video signal to the signal type if the video signal is different than the signal type of the video receiver.

8. The method of claim 7, wherein the disabling is done by disabling a video signal amplifier.

9. The method of claim 7, wherein the signal type is one of single ended and differential.

10. The method of claim 7, further comprising filtering the video signal for a single video transmission path.

11. The method of claim 7, further comprising filtering a single-ended video signal to be usable by a differential-ended termination.

12. The method of claim 7, further comprising filtering a differential-ended video signal to be usable by a single-ended termination.

* * * * *